April 19, 1938.    F. MASSAFRA    2,114,806

RESTAURANT CHARGE VOUCHER

Filed Dec. 22, 1936

Fig. 1

Fig. 2

Inventor
Felice Massafra
by Guido M. Sacerdote
Attorney

Patented Apr. 19, 1938

2,114,806

UNITED STATES PATENT OFFICE 2,114,806

RESTAURANT CHARGE VOUCHER

Felice Massafra, Brooklyn, N. Y.

Application December 22, 1936, Serial No. 117,158

1 Claim. (Cl. 283—60)

This invention relates to restaurant and hotel operation and more particularly refers to improvements in means for controlling the charges made by waiters to customers served by them, and gratuities bestowed by the customers upon the waiters.

In the conduct of a restaurant or other similar establishment, it is customary to assign a certain group of tables to each waiter and to change the waiter's location from day to day or week to week in rotation so as to average the takings of the various members of the personnel.

In many establishments all the waiters work under an arrangement whereby the gratuities given by the patrons of the establishment are pooled and are then divided in accordance with a predetermined scale or ratio.

In some establishments, particularly in dining-rooms operated by hotels for the benefit of their guests, charges are usually included in the final hotel bill, so that no money transactions take place between the guests and the waiters.

Still other arrangements under which the work of waiters is performed call for payment to the head waiter by the waiters of a certain proportion of the gratuities received by the waiters.

Each of the conditions above listed and others besides make it desirable to provide suitable means for controlling the amount of gratuities received by each waiter. Even when there is no pooling or sharing of gratuities it is desirable for the management to have an accurate idea of the earnings of each waiter and also an idea of the influence of the position of certain tables with respect to others in the amount of business secured. Such information places the management in a better position to determine the amount of regular compensation to which each waiter is entitled over and above the gratuities that he may expect to earn, and also places the management in a better position to gauge the ability and qualities of each individual waiter. Furthermore such information is also needed in order to figure the amount of the waiter's income, both for income tax and security act purposes.

In cases where pooling and sharing of gratuities is the rule it is, of course, important to make sure that each waiter turns in the full amount of his takings in fairness to all concerned.

In present practice the running of such a system is almost entirely dependent upon the honesty of each individual waiter, so that abuses are likely to, and do, take place because it is comparatively easy for a dishonest waiter to withhold without detection part of the money received.

The main object of the present invention is to provide novel and reliable means for controlling the waiter's receipts in order to improve the running of the type of establishments above mentioned, without greatly increasing the record keeping expense.

Another object is to provide means for controlling the amount of gratuities received by a waiter in a way that permits keeping an accurate check on such gratuities, both on the part of the management and the waiter himself.

A further object is to provide novel and improved means for keeping track of charges to be debited to the account of a hotel guest, including such gratuities as the guest may wish to bestow upon the waiters or attendants, doing away with the necessity on the part of the guests to directly pay such gratuities to the waiter or attendant himself.

A still further object is to provide a novel and improved blank for rendering an itemized bill to a guest for dining-room service, said bill containing ready and definite information adapted to serve as a guidance for the guest in determining the amount of gratuity he wishes to have added to the amount of the bill.

An additional object is to provide a blank of the character specified comprising a number of detachable tabs, each bearing the indication of an amount representing a certain predetermined proportion of the amount of the bill as rendered, said tabs being so arranged that the guest can readily detach for his own record and the guidance of the person in charge of the cash receipts the tab bearing the indication of the amount corresponding to the gratuity to be added to the amount of the bill.

Other objects and advantages of the present invention will more fully appear as the description proceeds and will be set forth and claimed in the appended claim.

The type of itemized bill blank forming the object of the present invention is illustrated by way of example in the accompanying drawing, in which:

Fig. 1 is a face view of a printed form comprising a series of detachable tabs adapted to receive indications of amounts proportional to the amount of the bill to be rendered to the customer, according to percentage indicia listed in columnar series directly opposite the corresponding tabs; and Fig. 2 is a fragmentary face view of a similar form where the proportional amounts are to be figured in accordance with a series of fractional coefficients instead of on a percentage basis.

Referring to said drawing, 10 designates a voucher or form, such as may be used by a waiter serving guests in a dining-room for listing the various items ordered by a guest and adding them up at the end of the meal.

Said voucher contains, as usual, a main space 11 where the various items can be listed in columnar form and columnar spaces 12, 13, at the right side thereof for entering the relative charges in dollars and cents. A space 14—15 is provided at the lower end of columnar spaces 12, 13, for entering the total amount of the bill.

One of the novel features of said voucher or form is the provision of a series of marginal tabs, such as shown at 16, 17, which are readily detachable independently of one another, the paper being slit between adjoining tabs, as shown at 18, and the attaching side of the tabs being defined by a set of longitudinal perforations 19, which makes it possible to readily detach one tab without interfering with the others.

Between said marginal series of tabs and space 11 of the voucher, I provide a column 20, extending parallel to the series of marginal tabs for the full length thereof.

Said column 20 bears indications of various percentages arranged in sequence directly opposite the marginal tabs, as shown at 21, said indications being preferably separated from one another by a dash line 22, causing the space defined by said column 21 to be divided in compartments corresponding to and directly opposite the detachable tabs.

The space 23 above the series of marginal tabs and columnar space 21 bears a suitable heading 24, stating that the detachable tabs and the indications of percentages are for the purpose of assisting the guest in determining the amount of gratuity, if any, on a percentage basis that he wishes to have added to the bill for service.

A clearer understanding of the purpose for which the detachable tabs and the percentage indications are intended is preferably given the customer by providing another space 25 in proximity of columnar space 21, said space 25 bearing an inscription 26 requesting the guest to express his wishes in regard to the gratuity that should be added to the amount of the bill by detaching the corresponding tab.

It is to be understood that tabs 16—17, etc., which are left blank while the bill is compiled and added up, are to be filled with the amounts corresponding to the percentage of the total amount of the bill appearing directly opposite each tab.

Said percentage amounts are entered on the tabs after the bill has been added up and before the bill is presented to the guest.

In order to make the set of entries called for by the series of marginal tabs, I propose to use a special calculating machine which can be set for the amount called for by the bill and which will automatically print the various percentage figures upon the tabs in a single operation.

For the purposes of the present invention, however, it is immaterial in what manner the figuring and entering of the percentage amounts upon the tabs are performed; if desired, the figures can be obtained from ready tabulated percentage tables and transcribed upon the tabs by hand or with the aid of a typewriter.

The important point is that when the bill is presented to the guest the series of marginal tabs will provide instant readings of the amounts corresponding to various percentages of the amount of the bill so that the guest can readily determine just what gratuity, if any, he wants to bestow upon the waiter.

The amount of the gratuity thus decided upon will be entered in the space 27—28 under the amount of the bill, and the total is entered below in space 29—30. The insertion and addition can be made by the waiter himself and payment can be made directly to the waiter or at the desk, according to the preference of the management.

The blank also includes a stub 31, which is separated from the main body thereof by a line of perforations 32, so that said stub is detachable and can be retained by the waiter for his own record. It is to be understood that the stub will bear such necessary indications corresponding to those given by the bill proper, as will serve later for checking and adjusting purposes.

As stated, the tabs 16, 17, are preferably made detachable so that the guest may tear off the tab bearing the amount corresponding to the gratuity that he wishes to pay; and with such an arrangement I prefer to also provide an additional columnar space 33 between the detachable tabs and columnar space 21, said columnar space 33 being divided in compartments corresponding to the tabs directly opposite thereto, said compartments providing blank spaces where duplicate notations of the percentage amounts can be entered as shown.

The form will also preferably have spaces, such as shown at 34—35—36—37 for identifying the room, waiter, table and check numbers or for providing such other indications as the accounting system used will call for.

The form, 38, shown in Fig. 2 is in every way similar to the one just described except that instead of calling for percentage amounts to be inscribed upon the tabs it calls for fractional amounts in accordance with fractional indications, such as shown at 39, in columnar space 21' directly opposite the respective tabs.

While the tabs or spaces are preferably filled in with figures corresponding to various percentages of or amounts proportional to the amount of the bill, it is within the scope of my invention to print directly upon the bill form a series of numbers say from five to ninety-five cents, in multiples of five cents, and another series in dollars from one to say five or ten, in place of the percentage amounts, so that the guest can simply indicate his wishes concerning the amount of the gratuity in dollars and cents, independently of the amount of the bill; such indications generally constituting a ready means for assisting the guest in deciding upon the amount of gratuity to be added and at the same time provide a reliable check upon the takings of the waiter for accounting purposes.

It is obvious that while the form of voucher described constitutes the preferred embodiment of my invention, various modificationss in the arrangement thereof can be made without departing from the inventive idea.

The drawing should, therefore, be understood as being intended for illustrative purposes only and not in a limiting sense. I accordingly reserve the right to carry my invention into practice in all those ways and manners which may enter, fairly, into the scope of the appended claim.

I claim:

A table service voucher blank, comprising a main body portion having appropriately designated columnar subdivisions for entering itemized charges and the addition thereof, said blank having at one of its longitudinal edges a plurality of appropriately designated detachable tabs arranged in vertical series, each of said tabs being adapted to be marked with one of a progressive series of indicia bearing a predetermined relation to the total amount of the bill, said body portion being marked with an appropriately designated longitudinal subdivision adjacent said tabs adapted to be marked to display corresponding indications directly opposite said tabs.

FELICE MASSAFRA.